June 23, 1959
H. E. CIER ET AL
2,891,894
PRODUCTION OF CYCLOHEXANE
Filed Nov. 14, 1956
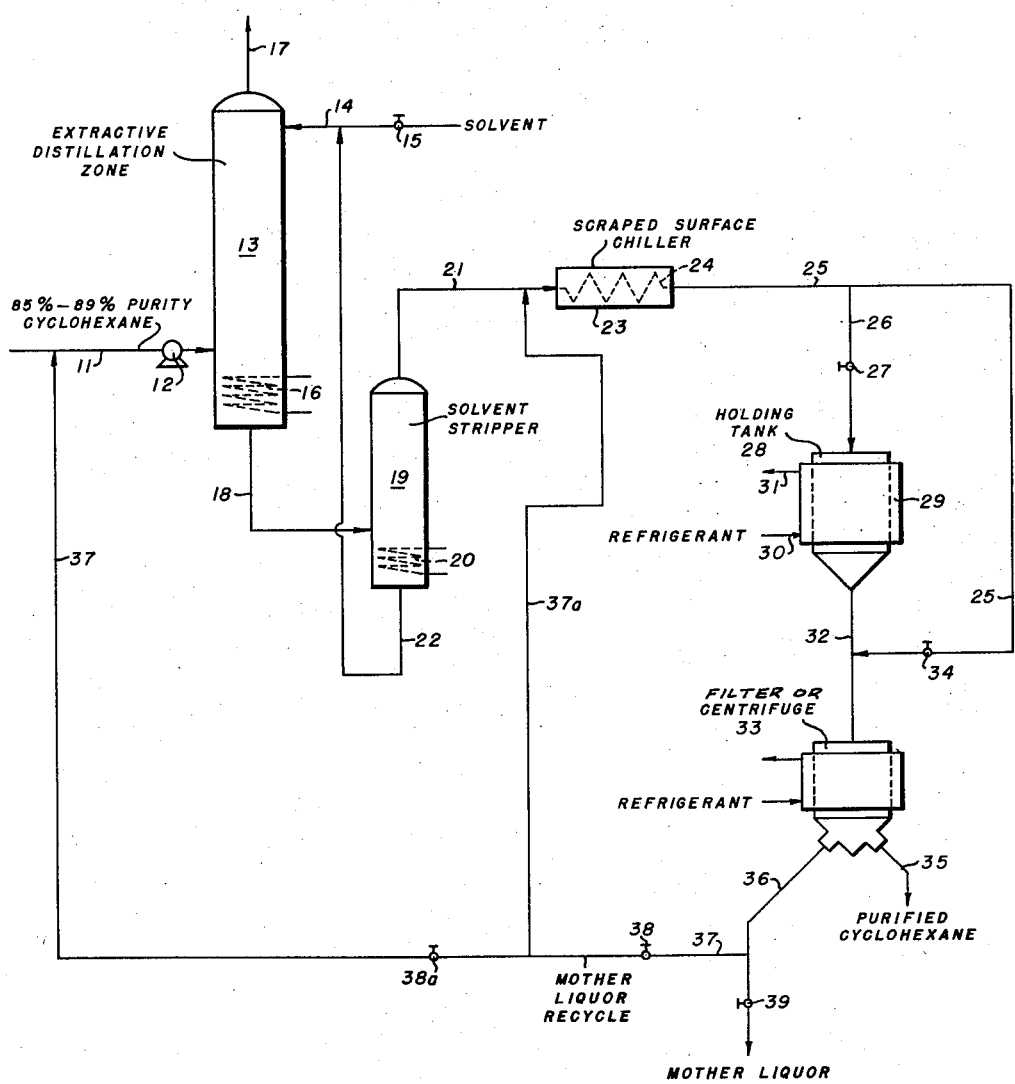
INVENTORS.
Harry E. Cier,
Mathis T. Waddell
BY
ATTORNEY.

United States Patent Office 2,891,894
Patented June 23, 1959

2,891,894

PRODUCTION OF CYCLOHEXANE

Harry E. Cier and Mathis T. Waddell, Baytown, Tex., assignors, by mesne assignments, to Esso Research and Engineering Company, Elizabeth, N.J., a corporation of Delaware Application November 14, 1956, Serial No. 622,064

9 Claims. (Cl. 202—39.5)

The present invention is directed to a method for recovering substantially pure cyclohexane from hydrocarbon fractions containing cyclohexane. More particularly the invention is concerned with a method of recovering cyclohexane in high yields of at least 98% purity and higher. In its more specific aspects, the invention is directed to purifying cyclohexane concentrates.

The present invention may be briefly described as a method for recovering high yields of cyclohexane in high purities by extractively distilling a cyclohexane fraction containing from about 85% to 89% by weight of cyclohexane in the presence of a solvent having a preferential solubility for cyclic hydrocarbons. The extractively distilled cyclohexane concentrate is separated into a fraction which contains substantially all of the isomeric heptanes which originally were present in the cyclohexane feed and a solvent extract which contains substantially all of the cyclohexane. The cyclohexane is removed from the solvent extract by distillation and the cyclohexane fraction thereby obtained is then chilled to a temperature in the range between about 32° and about —25° F. to form a slurry of cyclohexane crystals in a mother liquor. Cyclohexane crystals are then separated from the mother liquor in high purity and yield by a separation operation which may include a centrifugation or a filtration or a centrifugal filtration operation as may be desired. Purities of cyclohexane in the range from 99% to 99.5% may be obtained readily.

The solvent employed in the present invention is one having a preferential solubility for cyclic hydrocarbons. As examples of this type of solvent may be mentioned phenol, furfural, aniline, cyclohexanol, dimethylsulfolane and the like.

The solvent may be employed in a solvent to hydrocarbon ratio in the range from about 5 to about 15 to 1. Very desirable results are obtained with phenol using a ratio of phenol to feed hydrocarbon of about 13 to 1.

It is contemplated that at least a portion of the mother liquor remaining after separation of cyclohexane crystals may be recycled and chilled with the cyclohexane fraction to form the slurry. The other portion of the mother liquor may be discarded from the system.

The present invention is based on a discovery that certain compounds in cyclohexane fractions form solid solutions with cyclohexane which makes the production of high purity cyclohexane difficult to achieve by the conventional crystallization procedures. The compounds which are known to form solid solutions with cyclohexane are certain isoheptanes, particularly triptane and 3,3-dimethylpentane and dimethylcyclopentanes as well as other compounds. These hydrocarbons are usually encountered in fractions removed from crude petroleum which is fractionated to obtain the cyclohexane.

In accordance with the present invention, the feed stock from a crude petroleum naphtha is treated in order to allow the obtaining of increased yields of high purity cyclohexane without requiring expensive recrystallization procedures.

In order to achieve this desirable end a virgin crude petroleum naphtha containing cyclohexane is first distilled to produce a cyclohexane concentrate. In this distillation it is important that the final boiling point of the cyclohexane concentrate be adjusted to eliminate essentially all of the dimethylcyclopentanes. This may be done, for example, by producing a cyclohexane fraction containing from about 85% to about 89% by weight cyclohexane. The cyclohexane concentrate containing this amount of cyclohexane is then charged to an extractive distillation zone employing a solvent such as mentioned before in which cyclic hydrocarbons such as cyclohexane have a preferential solubility. In the extractive distillation operation substantially all of the isoheptanes will be removed. Particularly, substantially all of the triptane, 2,2-dimethylpentane, 2,4-dimethylpentane and about two-thirds of the 3,3-dimethylpentane will be distilled and removed from the cyclohexane concentrate. The extractively distilled cyclohexane concentrate after having solvent removed therefrom in a stripping operation is then charged to a crystallization zone where the remaining impurities are rejected as a filtrate and the high purity cyclohexane is recovered as crystals.

The present invention will be further illustrated by reference to the drawing in which the single figure is a flow diagram of a preferred mode.

Referring now to the drawing, numeral 11 designates a charge line by way of which a cyclohexane concentrate containing from about 85% to about 89% by weight purity cyclohexane is introduced into the system from a source not shown but which may be intermediate storage resulting from the distillation of crude petroleum containing cyclohexane. Line 11 contains a pump 12 by way of which the cyclohexane concentrate is introduced into an extractive distilaltion zone 13 which has suitable internal vapor-liquid contacting means such as bell capped trays, packing, and the like. Extractive distillation zone is also understood to include means for inducing reflux, condensing and cooling means and all auxiliary equipment usually found in a modern extractive distillation zone.

A solvent such as phenol is introduced by way of line 14 controlled by valve 15 into the system from a source not shown and the solvent contacts countercurrently the cyclohexane being distilled in zone 13. Zone 13 is provided with a heating means illustrated by a steam coil 16 for suitable adjustments of temperatures and pressures. Zone 13 is also provided with line 17 by way of which a fraction including substantially all of the isomeric heptanes is removed and discharged from the system for further use as may be desired. The extract fraction is removed from zone 13 by way of line 18 and discharged thereby into a solvent stripping zone 19 which is a distillation zone and which suitably may include the auxiliary facilities provided for zone 13 as has been described. In any event zone 19 is provided with a heating means illustrated by steam coil 20, line 21 for removal of a cyclohexane fraction and line 22 for discharge of the stripped solvent which is recycled to line 14 for return to the extractive distillation zone 13. The cyclohexane fraction in line 21 may have a purity from about 95% to about 98% by weight cyclohexane and is introduced thereby into a chilling zone 23 which suitably may be a scraped surface chiller wherein by passage through chilling coil 24 the cyclohexane is chilled to a temperature in the range from about 32° F. to about —25° F. to crystallize the cylohexane and to form a slurry of cyclohexane crystals in mother liquor. The slurry of cyclohexane crystals is then discharged from zone 23 by line 25 and preferably is discharged by line 26 controlled by valve 27 into a holding tank 28 provided with a suitable jacket 29 through which a refrigerant or coolant is circulated by means of lines 30 and 31.

It may be desirable under some circumstances to bypass holding tank 28 and to this end line 25 is shown connecting into line 32 by way of which the chilled slurry is discharged from the holding tank 28 into a separation zone 33 which either may be a centrifuge, a filter or a centrifugal filter. When it is desired to bypass the holding tank 28, valve 27 in line 26 will be closed and valve 34 in line 25 will be opened. In some circumstances it may be desirable to bypass all or a portion of the slurry in line 25 around the holding tank 28.

When the holding tank 28 is employed, it may be desirable to allow the slurry to remain therein for a time within the range from about 15 to about 240 minutes. A suitable holding time may be from about 30 to about 45 minutes.

The slurry on being introduced into the centrifuge or filter by way of line 32 is then separated into the purified cyclohexane crystals and mother liquor. The purified cyclohexane crystals of above 98% and preferably above 99% by weight cyclohexane may be withdrawn by line 35 for recovery or for use as may be desired. The mother liquor is withdrawn by line 36 and may be recycled by way of line 37 controlled by valve 38 and by branch line 37a to line 21 for admixture with the cyclohexane fraction prior to introduction of same into the chilling zone 23. Impurity buildup may be eliminated by recycling a portion of the mother liquor to zone 13 by opening valve 38a in line 37. The remainder of the mother liquor not recycled may be discharged from the system by opening valve 39 in line 36. It may be desirable to recycle about 365% by weight of the mother liquor to zone 23. Preferably about 65% by weight of mother liquor is recycled to line 11 to prevent impurity buildup when impure feeds in the lower part of the range given are employed.

It will be seen from the foregoing description taken with the drawing that a simple and readily adaptable process has been provided wherein a minimum amount of equipment is employed to provide maximum yields of high purity cyclohexane.

In order to describe and illustrate the benefits of the present invention further data are presented in the following Table I in which a fraction containing about 88% by weight cyclohexane is chilled and crystallized to separate purified cyclohexane in a two stage crystallization operation. In comparison with this operation the same cyclohexane feed is subjected to extractive distillation with phenol to obtain a purified cyclohexane fraction which is then subjected to crystallization to recover pure cyclohexane.

TABLE I

*Production of high purity cyclohexane*

| Stock Source | 1 Dist. of Virgin Naphtha | 2 Cryst. of Stock 1 | 3 Cryst. of Stock 2 | 4 Extract. Dist. of Stock 1 | 5 Cryst. of Stock 4 |
|---|---|---|---|---|---|
| Component Analysis, Wt. Percent: | | | | | |
| Cyclohexane | 87.9 | 98.2 | 99.4 | 96.8 | 99.3 |
| 2,2-DMP | 1.9 | | | | |
| 2,4-DMP | 5.1 | 0.4 | | 0.1 | |
| 3,3-DMP | 1.0 | 0.2 | 0.1 | 0.3 | 0.1 |
| 2,3-DMP | 0.9 | | | 0.7 | |
| 2,2,3-TMB | 1.1 | 0.6 | 0.3 | | |
| 2-MH | 0.6 | 0.1 | | 0.6 | 0.1 |
| 3-MH | 1.1 | 0.2 | 0.1 | 1.1 | 0.2 |
| 1,1-DMCP | 0.4 | 0.3 | 0.1 | 0.4 | 0.3 |
| 1,2-DMCP | 0.0 | | | | |
| 1,3-DMCP | 0.0 | | | | |
| Total | 100.0 | 100.0 | 100.0 | 100.0 | 100.0 |
| Yield, Based on Cyclohexane in Stock 1 | | | 45 | | 70 |

It will be seen from the data presented in the table that the virgin crude petroleum naphtha contains about 2.5% by weight of 3,3-dimethylpentane, 2,2,3-trimethylbutane and dimethylcyclopentanes. When this stock is crystallized, the cyclohexane resulting from the first crystallization is only of 98.2% purity and contains about 1.1% by weight of 3,3-dimethylpentane, 2,2,3-trimethylbutane and dimethylcyclopentane. It is necessary to recrystallize this stock to obtain over 99.4% purity cyclohexane. Comparing these data, however, with the present invention represented by the fourth and fifth columns of data, it will be seen that when the feed stock is extractively distilled a fraction containing 96.8% by weight of cyclohexane is obtained and this fraction contains 0.7% of 3,3-dimethylpentane, no 2,2,3-trimethylbutane and 0.4% of dimethylcyclopentane. On crystallizing this stock a cyclohexane fraction of 99.3% by weight is obtained with the remainder being traces or small amounts of the impurities originally present in the feed stock.

It will be seen from these data that the feed naphtha contains large amounts of the impurities and that these impurities which form solid solutions with the cyclohexane are not readily removed in a first crystallization and required recrystallization to obtain better than 99% purity. However, when the present invention is employed the extractive distillation of the virgin naphtha results in a substantial removal of the compounds which form solid solutions such that on one crystallization a cyclohexane of 99.3% purity is obtained. This is quite important in that it is possible to obtain substantial and unexpected improvements with the practice of the present invention over the prior art processes. Furthermore, by recycling mother liquor, it is possible to operate with discard only of the raffinate from the extractive distillation and with recovery of substantially all of the cyclohexane in the solvent extract. The present invention thus produces maximum production and high yields of high purity stocks whereas other processes produce high purities but with a sacrifice in yield as shown by the data.

High purity cyclohexane is very important since cyclohexane is employed and is useful as a feed stock in the production of nylon. Furthermore, high purity cyclohexane is useful as a chemical intermediate.

The nature and objects of the present invention having been completely described and illustrated what we wish to claim as new and useful and secure by Letters Patent is:

1. A method for recovering maximum high yields of high purity in the range from 99% to 99.5% cyclohexane which consists of extractively distilling in the presence of a solvent having a preferential solubility for cyclic hydrocarbons, a benzene free hydrocarbon fraction consisting essentially of from about 85% to about 89% by weight of cyclohexane and isomeric heptanes including 2,2,3-trimethylbutane and 3,3-dimethylpentane to form a distillate fraction containing substantially all of the isomeric heptanes and an extract fraction containing said solvent and from about 95% to 98% by weight cyclohexane, separating a cyclohexane fraction from the extract fraction by distillation, chilling the cyclohexane fraction to a temperature in the range between about 32° and about −25° F. to form a slurry of cyclohexane crystals in mother liquor, and separating cyclohexane crystals from said mother liquor in high purity and yield.

2. A method in accordance with claim 1 in which the solvent is phenol.

3. A method in accordance with claim 1 in which the solvent is furfural.

4. A method in accordance with claim 1 in which the cyclohexane crystals are separated by filtration.

5. A method in accordance with claim 1 in which the cyclohexane crystals are separated by centrifugation.

6. A method for recovering maximum high yields of high purity in the range from 99% to 99.5% cyclohexane which consists of extractively distilling in the presence of a solvent having a preferential solubility for cyclic hydrocarbons, a benzene free hydrocarbon fraction consisting essentially of from about 85% to about 89% by weight of cyclohexane and isomeric heptanes including 2,2,3-trimethylbutane and 3,3-dimethylpentane and dimethylcyclopentanes, to form a distillate fraction containing substantially all of the isomeric heptanes and an extract fraction containing said solvent, from about 95% to 98% by weight of cyclohexane and the remainder isomeric heptanes containing no more than about 1% by weight of 2,2,3-trimethylbutane and 3,3-dimethylpentane, separating a cyclohexane fraction from the extract fraction by distillation, chilling the cyclohexane fraction to a temperature in the range between about 32° and about —25° F. to form a slurry of cyclohexane crystals in mother liquor, and separating cyclohexane crystals from said mother liquor in high purity and yield.

7. A method for recovering maximum high yields of purity in the range from 99% to 99.5% consists of cyclohexane which consists of extractively distilling in the presence of a phenol solvent a benzene free hydrocarbon fraction consisting essentially of from about 85% to about 89% by weight of cyclohexane and isomeric heptanes including 2,2,3-trimethylbutane and 3,3-dimethylpentane to form a distillate fraction containing substantially all of the isomeric heptanes and an extract fraction containing said solvent, from about 95% to about 98% by weight of cyclohexane and the remainder isomeric heptanes containing no more than about 1% by weight of 2,2,3-trimethylbutane and 3,3-dimethylpentane, separating a cyclohexane fraction from the extract fraction by distillation, chilling the cyclohexane fraction to a temperature in the range between about 32° and about —25° F. to form a slurry of cyclohexane crystals in mother liquor and centrifuging said slurry to separate cyclohexane crystals from said mother liquor in high purity and yield.

8. A method in accordance with claim 7 in which at least a portion of the mother liquor is recycled for admixture with the cyclohexane fraction prior to chilling.

9. A method for recovering maximum high yields of high purity in the range from 99% to 99.5% cyclohexane which consists of extractively distilling in the presence of a phenol solvent a benzene free hydrocarbon fraction consisting essentially of from about 85% to about 89% by weight of cyclohexane and isomeric heptanes including 2,2,3-trimethylbutane and 3,3-dimethylpentane to form a distillate fraction containing substantially all of the isomeric heptanes and an extract fraction containing said solvent and from about 95% to about 98% by weight of cyclohexane, separating a cyclohexane fraction from the extract fractioin by distillation, chilling the cyclohexane fraction to a temperature in the range between about 32° and about —25° F. to form a slurry of cyclohexane crystals in mother liquor, and separating cyclohexane crystals from said mother liquor in high purity and yield.

References Cited in the file of this patent

UNITED STATES PATENTS 2,766,303     Bennett et al.     Oct. 9, 1956

FOREIGN PATENTS 136,038     Australia     Sept. 10, 1946
649,983     Great Britain     Feb. 7, 1951